Patented Mar. 28, 1939

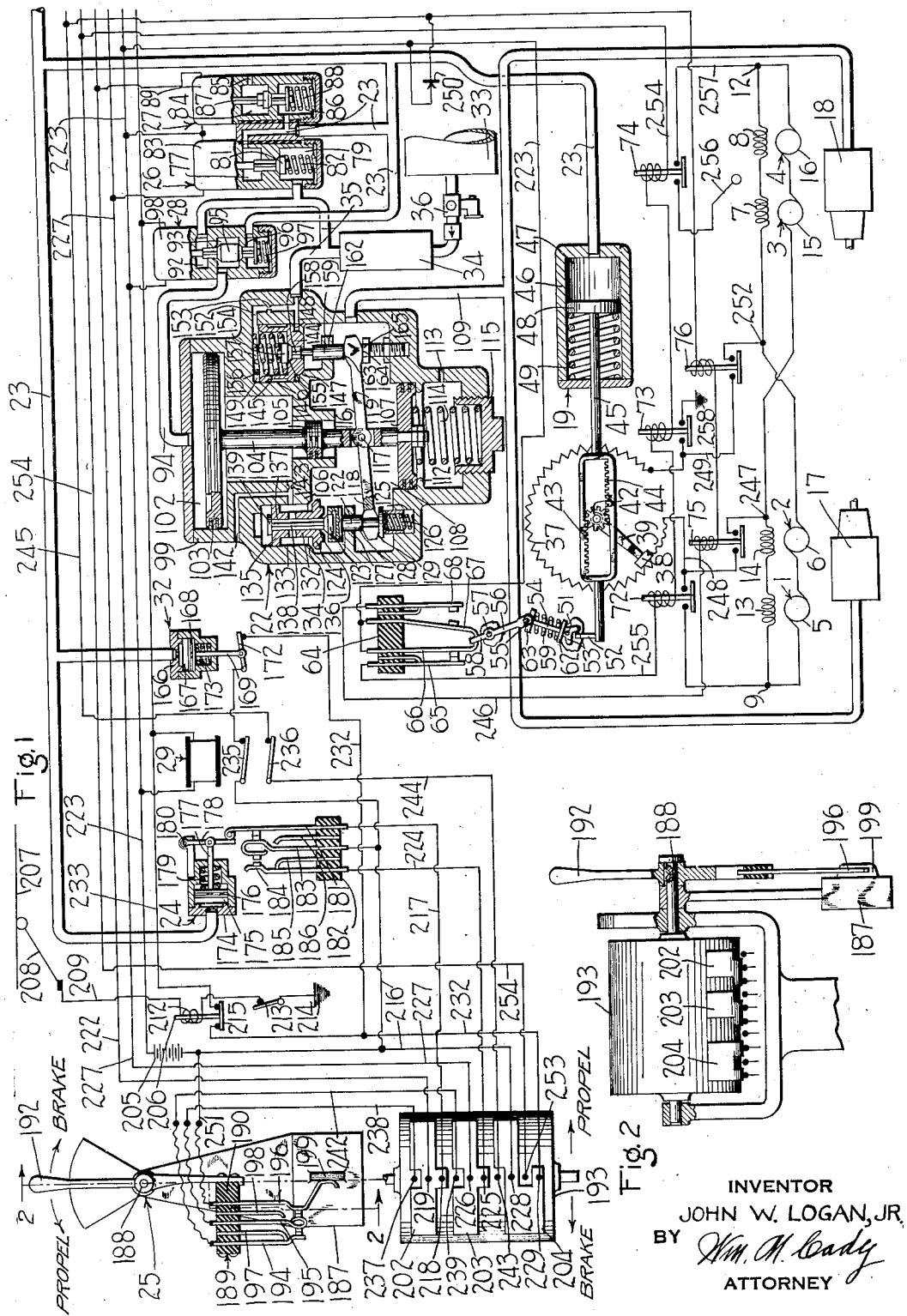

2,151,924

UNITED STATES PATENT OFFICE 2,151,924

ACCELERATION AND DECELERATION CONTROL

John W. Logan, Jr., Forest Hills, Pa., assignor to The Westinghouse Air Brake Company, Wilmerding, Pa., a corporation of Pennsylvania Application June 19, 1936, Serial No. 86,094

48 Claims. (Cl. 192—1)

My invention relates to a control system for railway vehicles and more particularly to a system for controlling the acceleration and deceleration of electrically propelled vehicles.

In the operation of high speed trains and similar vehicles it is desirable to provide a brake equipment having ample braking capacity to take care of the most rigid service the equipment may be called upon to meet. It is well known that for a given braking pressure friction type brakes which operate on the rims of the vehicle wheels are less effective in retarding the motion of a vehicle at high speeds than at low speeds because the co-efficient of friction between the rubbing parts is lower at high speeds than at low speeds. On the other hand, an electro-dynamic brake operated to produce a retarding torque on the vehicle wheel is more effective at high speeds than at low speeds. In order to stop high speed trains and vehicles in a relatively short time it is desirable that a braking equipment be provided which combines the characteristics of the two types of brakes.

It is further desirable that the train or vehicle be decelerated smoothly and at a selected rate of retardation. For this purpose it is proposed to provide a retardation controller for regulating the degree of application of the brakes. This may comprise an inertia responsive device such as a pendulum that assumes various positions in accordance with the variations in the rate of deceleration (or acceleration) of the vehicle and is adapted by means of electric circuits, or otherwise, to control the degree of application of the brakes, or the acceleration of the propulsion motor. It is desirable also in a vehicle of the type in which a plurality of driving motors are effective on a plurality of driven wheels to control the acceleration of the vehicle as well as the deceleration thereof.

It is an object of my invention to provide control equipment for railway vehicles wherein a single control handle controls both the braking and propulsion of the vehicle and determines the predetermined rate of acceleration or deceleration in accordance with the position of the control handle.

It is a further object of my invention to provide control equipment for railway vehicles for controlling both the propulsion and braking of the railway vehicle by the pressure in a single train pipe in accordance with variations in the pressure therein above or below a predetermined or normal value.

It is a further object of my invention to provide braking equipment for railway vehicles in which a plurality of braking means are provided that are controlled by a common brake controlling device in accordance with a desired degree of braking.

It is a further object of my invention to provide a retardation controlled braking system employing a fluid pressure brake and an electric brake and in which the braking force of one brake is withheld so long as the braking force of the other is capable of producing the desired rate of retardation.

It is a still further object of my invention to provide a retardation controlled braking system having a fluid pressure brake and a dynamic brake in which both brakes are controlled to give a predetermined required total braking, the two brakes being independent but having an interlocking control such that the dynamic brake automatically controls the fluid pressure brake to limit the degree of application thereof to the value necessary to effect a desired rate of retardation.

Other objects and advantages of my invention will be apparent from the following description of one preferred embodiment thereof taken in connection with the accompanying drawing in which Fig. 1 is a diagrammatic view of apparatus and circuits illustrating one preferred embodiment of my invention, and Fig. 2 is a front view of the controller partly in elevation and partly in section.

Referring to the drawing, the apparatus illustrated in Fig. 1 is that employed on the first car or train unit of a train comprising a plurality of cars or train units, it being understood that the brake mechanism responsive to the pressure in the train line pipe is duplicated for the additional train units. In Fig. 1 the head car comprises two trucks having two axles each, each axle being provided with a driving motor, the four motors 1, 2, 3 and 4, corresponding, respectively, to the four axles of the two trucks. The motors are permanently connected in series parallel relation, the armature windings 5 and 6 of the motors 1 and 2, respectively, being connected in series with the field windings 7 and 8 of the motors 3 and 4, respectively, between junction points 9 and 12, and the field windings 13 and 14 of the motors 1 and 2, respectively, being connected in series circuit relation with the armature windings 15 and 16 of the motors 3 and 4, respectively, between the junction points 9 and 12. Two brake cylinders 17 and 18 are illustrated corresponding to the two car trucks. The dynamic or electric brakes are controlled by a pressure operated rheostatic controller device 19 and the fluid pressure brakes are controlled by a relay valve device 22 in accordance with the pressure in a train pipe 23 which is controlled by a manually operable controller 25 through operation of an admission magnet valve device 26, a release magnet valve device 27 and a change-over magnet valve device 28. A holding relay 29 and a pressure operated switch 32 are provided for controlling the transfer magnet valve device 28 in a manner to be later described.

Each car or train unit is provided with an individual compressor for supplying compressed air to a main reservoir 33 from which fluid under pressure is supplied to a supply reservoir 34 and a supply reservoir pipe 35 at some predetermined pressure, say one hundred pounds, as supplied by the pressure reducing valve 36.

The rheostatic controller device 19 comprises a resistor 37 and a cooperating contact member 38 that is moved by an arm 39 and pinion 42 that may be engaged by the teeth of a rack 43, or a rack 44, carried by a stem 45 in accordance with movement of the stem in the one or the other direction. The controller is operated by a cylinder having a casing 46 providing a piston chamber 47 containing a piston 48 connected to the stem 45, and about which is positioned a spring 49 for urging the stem and piston toward the right.

A lug 52 is provided on the outer end of the stem 45 for engaging fingers 53 of a toggle mechanism comprising a lever 54 pivotally mounted on a pin 51 and having a slidable collar or crosshead 63 about one end thereof that is connected by a pin 55 to the bifurcated lower end of a lever 56 that is pivotally mounted on a pin 57, and the upper end 58 of which is adapted to operate the switch mechanism in a manner to be later described. A spring 59 is provided about the lever 54, the lower end of which engages a flange 62 thereon and the upper end of which engages the crosshead 63 that slides on the lever 54 and engages the bifurcated end of the lever 56 and urges it upwardly from the flange 62. A switch member comprising a block 64 is provided having spring contact members 65, 66, 67 and 68 mounted thereon and extending downwardly therefrom to be actuated by the toggle mechanism for controlling propulsion contactors 72, 73 and 74 and dynamic brake contactors 75 and 76 in a manner to be later described.

The admission magnet valve device 26 comprises a casing containing a chamber 77 that is in constant open communication with passage and pipe 23, and a chamber 79 that is in constant open communication with supply reservoir pipe 35 and which contains an admission valve 81 for controlling communication between the supply reservoir pipe 35 and the train pipe 23. A spring 82 is provided within the chamber 79 for normally forcing the valve 81 to its seat, the valve being adapted to be forced from its seat against the bias of the spring 82 by a magnet 83 in the upper part of the casing.

The release magnet valve device 27 comprises a casing containing a release valve chamber 84 that is in constant open communication with the atmosphere through a release port 85, and a chamber 86 that is in constant open communication with the train pipe 23. A release valve 87 is provided within the release valve chamber 84 and a spring 88 is provided within the chamber 86 for urging the valve 87 from its seat. A magnet 89 is provided in the upper part of the casing which, when energized, forces the valve 87 to its seat against the bias of the spring 88.

The transfer magnet valve device 28 comprises a casing containing a chamber 92 that is in constant open communication with the supply reservoir pipe 35, a chamber 93 that is in constant open communication with a piston chamber 102 of the relay valve 22 through pipe 94, and a chamber 96 that is in constant open communication with the train pipe 23. A double beat valve 95 is provided within the valve chamber 93, and is adapted to be urged to its upper seat by a spring 97 provided within the chamber 96 and downwardly to its lower seat by a magnet 98 in the upper part of the casing.

The relay valve device 22 comprises a casing 99 providing the aforenamed piston chamber 102 containing a piston 103 having a stem 104 extending forwardly therefrom and having a packing piston 105 thereon that is slidable within a bore in a wall 106 transversely of the casing and a piston 107 at the other end thereof that is of less diameter than the piston 103. The transverse wall 106 and the piston 107 in part define a pressure chamber 108 contained within the casing 99 and constantly connected to the brake cylinders 17 and 18 through brake cylinder pipe 109. A flange 112 is provided on the casing to form a seat for the piston 107 and the space below the piston 107 is open to the atmosphere through a port 113. A spring 114 is provided for biasing the pistons 107 and 103 upwardly, the upper end of which engages against the piston 107 and the lower end of which engages within a recess in a nut 115 attached within a bore in the casing.

The piston stem 104 is provided, within the pressure chamber 108 between the packing piston 105 and the piston 107, with a rockable lever 116 carried by a bolt or bearing pin 117 and having oppositely disposed arms 118 and 119 which are adapted to control the operation of a release valve mechanism and a supply valve mechanism, respectively.

The release valve mechanism comprises a plunger 122, a pilot release valve 123, and a main release valve 124. The plunger 122 is slidably guided at one end in a bore 125 in the casing. Contained in the bore is a spring 126 which operatively engages the plunger and, as will hereinafter be more fully explained, exerts a light counter-balancing pressure on the piston assembly. The plunger adjacent its other end is slidably guided in a bore 127 in the casing. Intermediate the bores 125 and 127 the plunger is reduced in diameter to form spaced shoulders 128 and 129 which are adapted to be operatively engaged by oppositely disposed contact surfaces on the end of the arm 118 of the lever 116, the end portion of the lever being bifurcated to accommodate the portion of the plunger between the shoulders. The plunger is operatively connected to the pilot release valve 123.

The main release valve 124 is provided with a stem 132 which is axially aligned with the plunger 122 and is positioned within a bore 133 provided at one end with a valve seat 134 for the release valve 124. The valve stem is provided with a piston 135 slidably mounted within the bore 133. The main release valve 124 is provided with a valve seat 136 on which, as hereinafter more fully explained, the pilot release valve 123 is adapted to seat, and is provided with an axial bore 137 which extends from the valve seat 136 through the valve stem 132 to the outer face of the piston 135.

The pilot valve 123 is provided with a stem 138 which passes longitudinally through the bore 137 in the main release valve and which at its end is provided with a stop nut 139. A chamber between the main release valve 124 and the piston 135 is in constant open communication with the atmosphere through the passage 142, as is also the space between the piston 103 and the packing pistons 105 through the restricted choke 143.

The supply valve mechanism may comprise a supply valve 144 forming one end of a piston 145 slidably mounted within a bore 146 within the casing and provided, at one end of the bore, with a seat 147 for the valve 144, and above which is formed a chamber 148 that is in constant open communication with the supply reservoir pipe 35. The main supply valve 144 is movable into or out of seating engagement with the valve seat 147 to control communication between the supply reservoir pipe 35 and the pressure chamber 108.

At the side of the valve piston 145 opposite the pressure chamber 108 there is provided a chamber 149 which is connected to the chamber 148 through a passage 152 having a choke 153 therein.

Contained in the chamber 149 is a pilot supply valve 154 which is adapted to move into and out of engagement with the seat 155 provided on the inner side of the piston 145 to control communication through a central bore in the piston between the chamber 149 and the pressure chamber 108.

Also contained in the chamber 149 are control coil springs 156 and 157, which at all times urge the supply valve 144 and the pilot supply valve 154, respectively, toward their seats. The spring 156 is interposed between and operatively engages the piston 145 and the casing wall at the end of the chamber 149. The spring 157 is encircled by the spring 156 and is interposed between and operatively engages the pilot valve 154 and the outer wall of the chamber 149.

The valve 154 is provided with a stem 158 that engages one end of a plunger 159 that is carried in a bore 162 in a portion of the casing structure, the other end of the plunger 159 engaging a convex surface 163 on the end of the arm 119 of the lever 116. The opposite concave surface 164 of the arm engages a stop nut or fulcrum member 165 screw-threadedly attached within a bore in the casing structure. The fulcrum member 165 is adjustable relative to the casing.

The pressure operated switch 32 comprises a casing 166 providing a piston chamber 167 containing a piston 168 that is provided with a stem 169 for actuating a movable switch contact member 172. A spring 173 is provided about the stem 169 for urging the piston 168 and the contact member 172 upwardly to a circuit interrupting position unless the pressure within the piston chamber 167 is above some predetermined value, such, for example, as twenty pounds per square inch.

The pressure regulating device 24 comprises a casing 174 providing a piston chamber 175 containing a piston 176 having a stem 177 connected to a switch operating member 178, one end of which is supported on a pivot pin 180 and the other end of which engages a leaf spring switch member 181 that is mounted in an insulating block 182 and normally biased toward the left as viewed in the drawing. The switch assembly also includes the switch contact members 183 and 184 that are likewise mounted in the block 182 and normally biased toward the right as viewed in the figure. Stop members 185 and 186 are provided for limiting the travel of the spring contact members 184 and 183, respectively, toward the right.

The manually operable controller 25 is of the inertia type and comprises a pendulum 187 mounted pivotally on a shaft 188 upon which is also mounted a switch assembly 189 actuated by a handle 192, to which the shaft 188 is attached, to operate a drum 193, also connected to the shaft 188.

The switch assembly 189 comprises an insulating block 190 carried on the lower end of the lever 192 and on which are mounted the spring contact members 194, 195 and 196, all of which are biased toward the right as viewed in the drawing. Stop members 197 and 198 are also mounted on the block 194 for limiting the travel of the spring contact members 194 and 195, respectively, toward the right. The lower end of the spring contact member 196 extends downwardly and is adapted to be engaged by a lug 199 carried on the pendulum 187.

The drum 193 is provided with three conducting segments 202, 203 and 204, the contact segment 202 controlling the release application magnet valve device 27, the contact member 203 controlling the admission magnet valve device 26, and the contact segment 204 controlling the power contactors 72, 73 and 74, and the dynamic braking contactors 75 and 76 through circuits extending from a source of electric energy 205 as later explained.

A contactor 206 that is responsive to trolley failure is provided and is energized by a circuit extending from the over-head line conductor 207, through trolley 208, conductor 209, the winding 212 of the contactor 206, the manual switch 213 to ground at 214, to hold the contact member 215 thereof upwardly to a circuit closing position.

*Charging the system*

Before proceeding further with the description of the operation of the system it will be helpful to keep in mind that the train pipe 23 is normally supplied with fluid under pressure at some predetermined pressure, say fifty pounds, and that a reduction in pressure below this value effects the application of the brakes while an increase in pressure above this value causes the supply of electric power to the driving motors.

The spring 114, within the relay valve device 22, is designed to exert such force that at pressures above some predetermined value within the piston chamber 102, say forty eight pounds, the pistons 103 and 107 will remain in their illustrated positions, but upon a reduction in pressure below this value the upward force of the spring 114 will be greater than the opposing force of fluid under pressure acting against the spring, and the pistons will be moved upwardly to effect a pneumatic application of the brakes. The pressure regulating device 24 is designed to maintain this desired floating pressure within the train pipe 23 when the controller 25 is in its mid or illustrated position.

The spring 49 in the rheostatic controller device 19 is so designed that when the pressure within the train pipe 23 and within the piston chamber 47 is at a desired floating value, corresponding to neither motoring nor braking operation, the piston 48 and the racks 43 and 44 will be in their illustrated positions, the contact member 38 being in a position such that the resistor 37 is entirely included within whichever circuit is next established through the motors by operation of the power contactors 72, 73 and 74 to their circuit closing positions, or operation of the dynamic braking contactors 75 and 76 to their circuit closing positions. When the handle 192 of the manually operable controller 25 is in its mid or illustrated position, the circuit for energizing the power contactors 72, 73 and 74 and the dynamic braking contactors 75 and 76 are both interrupted so that neither a braking nor a motoring operation is effected.

If power is supplied from the trolley conductor 207 through the windings 212 of the contactor 206 to ground at 214, the contactor 206 will be in a circuit closing position, thus closing a circuit from the positive terminal of the battery 205 through conductor 216, contact member 228, conducting segment 204, contact member 229, conductor 232, switch contact member 215 of the contactor 206, conductor 233, the windings of the holding relay 29 and of the magnet 98 in parallel, and conductor 223 to the negative terminal of the battery 205, thus energizing the relay 29 and causing the contact members 235 and 236 thereof to be actuated to their upper or illustrated positions. The circuit through the switch contact member 235 is not completed at this time, being interrupted at the switch contact member 172 of the pressure operated switch device 32 which is in its upper or circuit interrupting position since the pipe 23 has not yet been charged. The circuit through the relay contact member 236 is not completed at this time, being interrupted at the contact member 243 since, in the illustrated position of the drum 193, the contact member 243 is out of engagement with the conducting segment 204 thereof. The magnet 98 of the transfer magnet valve device 28 that is energized in parallel with the relay 29, causes the double beat valve 95 to be forced to its lower seat against the bias of the spring 97 to close communication between the pipe 23 and the piston chamber 102 and effect communication from the supply pipe 35 to the piston chamber 102.

Since, when no pressure exists in the train pipe 23 and in the piston chamber 175, no pressure is exerted against the piston 176 of the pressure regulating device 24, the spring 179 forces the piston 176 toward the left to relieve the pressure of the member 178 on the spring contact member 181 sufficiently to permit the member 181 to engage the spring contact member 183 and force it toward the left sufficiently to engage the spring contact member 184. A circuit is thus closed from the positive terminal of the battery 205 through conductor 216, the contact member 183, contact member 181, conductor 217, contact member 218, the conducting segment 202 of the drum controller, contact member 219, conductor 222, through the winding of the magnet 89 of the released magnet valve device 27, and by conductor 223 to the negative terminal of the battery 205, thus energizing the magnet 89 and forcing the release valve 87 downwardly to its seat against the bias of the spring 88, thus closing communication from the train pipe 23 to the atmosphere. Each of the release magnet valve devices on the several local units of the braking system are similarly energized.

A circuit is also completed from the positive terminal of the battery 205 through conductor 216, switch contact members 183 and 184, conductor 224, the contact member 225, conducting segment 203 and contact member 226, conductor 227, through the winding of the magnet 83 of the admission magnet valve device 26, and by conductor 223 to the negative terminal of the battery 205, thus energizing the magnets 86 of the several magnet valve devices 26 and forcing the admission valve 81 downwardly against the bias of the spring 82 to open communication between the supply reservoir 35 and the train pipe 23.

In charging the system fluid under pressure flows from the main reservoir 33 of each train unit to the associated supply reservoir 34, as supplied by the pressure reducing valve 36, and through supply reservoir pipe 35 to charge the supply chamber 148 of the relay valve device 22, and through chamber 92 of the transfer magnet valve device 28, past the double beat valve 95 in its lower seated position, to chamber 93 and through pipe 94 to the piston chamber 102 to force the pistons 103 and 107 downwardly to their illustrated positions, thus providing supply reservoir pressure within the piston chamber 102. Fluid under pressure also flows from the supply reservoir pipe 35 through chamber 79 in the admission magnet valve device 26, past the unseated admission valve 81, to chamber 77 and to the train pipe 23 to charge the train pipe. Fluid under pressure flows from the train pipe 23 to the piston chamber 175 of the pressure regulating device 24, to the piston chamber 167 of the pressure operated switch device 32, and to the piston chamber 47 of the rheostat controller device 19.

At some predetermined relatively low pressure, say twenty pounds, the pressure in the piston chamber 167 of the pressure operated switch 32 will actuate the switch contact member 172 downwardly against the bias of the spring 173 to its circuit closing position. The contact member 172 now closes a holding circuit from the positive terminal of the battery 205 through conductor 216, relay contact member 235, contact member 172 of the pressure operated switch device 32, conductor 232, the contact member 215 of contactor 206 to conductor 233, and from conductor 233 through parallel circuits including the winding of the relay 29 and the winding of the magnet 98 of the transfer magnet valve device 28 to conductor 223, and to the negative terminal of the battery 205, thus maintaining the relay 29 and the transfer magnet valve device 28 energized independently of movement of the controller drum 193.

As the pressure within the train pipe 23 reaches the predetermined floating value of fifty pounds the pressure within the piston chamber 175 forces the piston 176 and the switch actuating member 178 sufficiently toward the right to permit the spring contact member 183 to be moved out of engagement with the contact member 184, thus interrupting the above traced circuit through the winding of the application magnet 83, and permitting the valve 81 to be forced to its seat by the force of the spring 82, thus maintaining the admission valve 81 and the release valve 87 on each braking unit of the train in lap position. Should the pressure within the train line pipe 23 increase appreciably above the desired value of fifty pounds the piston 176 will be forced sufficiently toward the right against the bias of the spring 179 to move the switch contact member 181 out of engagement with the switch contact member 183, and interrupt the above traced circuit through the winding of the magnet 89 of the release magnet valve device 27 thus deenergizing the magnet 89 and permitting the spring 88 to force the valve 87 upwardly from its seat and effect the release of fluid under pressure from the train pipe 23 to the atmosphere through port 85 until the pressure within the pipe 23 has been reduced sufficiently to permit the regulating device 24 to again cause engagement of the switch contact members 181 and 183, to again move the release valve 87 to lap position.

Operation

If the operator wishes to apply the brakes the handle 192 is moved in a clockwise direction, as viewed in Fig. 1, thus moving the block 189 and the switch contact members carried thereby toward the left, releasing the pressure between the spring contact member 196 and the lug 199 on the pendulum 187, to permit the spring contact member 196 to move from engagement with the contact member 195, and the contact member 195 to move from engagement with the contact member 194, and, at the same time, move the segments 202, 203 and 204 of the drum 193 toward the left as viewed in Fig. 1, thus interrupting the circuits through the contact members 184 and 181 of the pressure regulating device 24, the contact members 218 and 225 and cooperating drum segments 202 and 203, respectively, and connecting the drum segment 202 through contact member 237 and conductor 238 to the switch contact member 195, and connecting the segment 203 through contact member 239 and conductor 242 to the switch contact member 194.

It will be noted, therefore, that the above movement of the controller handle interrupts the circuits controlling the admission and release magnet valve devices 26 and 27, respectively, on the several train units and substitutes the switch contact members on the switch assembly 189 for those on the pressure regulating device 24 as the control contact members for these devices. Fluid under pressure is thus vented from the train pipe 23 past the unseated release valve 87 to the atmosphere through port 85 to reduce the train pipe pressure and permit the piston 48 of the control device 19 to be moved toward the right by the spring 49. As the piston 48 starts to move toward the right the lug 52 on the end of the stem 45 engages the right hand finger 53 of the toggle device operating it to a position to separate the contact members 65 and 66 and cause engagement of the contact members 67 and 68. A circuit is thus closed from the positive terminal of the battery 205 through conductor 216, the contact member 228 on the controller drum, conducting segment 204, contact member 243, conductor 244, the relay contact member 236, conductor 245, the windings of the dynamic brake contactors 76 and 75, conductor 246, the switch contact members 68 and 67 of the toggle operated switch mechanism, and conductor 223 to the negative terminal of the battery 205, thus energizing the dynamic braking contactors 75 and 76, and operating them to their upper or circuit closing positions. A dynamic braking circuit is thus closed from the juction point 247 through dynamic braking contactor 75, conductor 248, contact member 38 carried by the rheostat arm 39, the rheostat resistor 37, conductor 249, the contact member of the dynamic braking contactor 76 to the junction point 252, and through two parallel branch circuits, one branch extending from the junction point 252, through the field windings 7 and 8 of the motors 3 and 4 respectively, and the armature windings 16 and 15 to the junction point 247, the other branch extending from the junction point 252 through armature windings 6 and 5 of the motors 2 and 1, respectively, and field windings 13 and 14 to the junction point 247.

As the pressure in the train pipe 23 decreases the piston 48 and the stem 45 gradually move toward the right, the rack 43 actuating the pinion 42 to move the contact member 38 in a clockwise direction to decrease the amount of resistance 37 remaining in the dynamic braking circuit, thus increasing the dynamic braking force.

As the dynamic braking force increases the pendulum 187 of the controller will move further toward the left until the lug 199 engages the switch contact member 196 and causes it to be moved into engagement with the switch contact member 195 to close a circuit from the positive terminal of the battery 205 through conductor 251, the switch contact members 196 and 195, conductor 238, contact member 237, the conducting segment 202, contact member 219, conductor 222, the winding of the magnet 89 of the release magnet valve device 27 and by conductor 223 to the negative terminal of the battery 205, thus energizing the magnet 89 and forcing the valve 87 downwardly to its seat to close communication between the train pipe 23 and the atmosphere through the exhaust port 85 to prevent further reduction in the pressure in the train line pipe 23.

If, while the dynamic brakes are applied, the operator wishes to release the brakes the handle 192 is returned to its illustrated position, thus interrupting the previously traced circuit for energizing the windings of the dynamic braking contactors 75 and 76 upon separation of the contact member 243 from the conducting segment 204 on the controller drum 193, and permitting the dynamic braking contactors 75 and 76 to drop to their illustrated or circuit interrupting positions. Movement of the controller drum 193 to its illustrated position also interrupts the control circuit through the contact members 237 and 239 cooperating with the conducting segments 202 and 203, respectively, of the controller drum 193 and substitute contact members 184 and 181 of the pressure regulating device 24 for the contact members 194 and 195, respectively, of the controller switch assembly to control the release and admission magnet valve devices 27 and 28. Since, upon application of the dynamic brakes, the pressure in the train pipe 23 was reduced below the floating value that is normally maintained by the regulator 24, the piston 176 and the control member 178 will have moved toward the left sufficiently to cause engagement of the switch contact members 181, 183 and 184 to energize the winding of the magnets 89 and 83 of the magnet valve devices 27 and 26, respectively, upon return of the controller drum 193 to its illustrated position. Thus energized, the magnet 89 forces the release valve 87 to its seat to close communication between the train pipe 23 and the atmosphere, and the magnet 83 forces the admission valve 81 downwardly from its seat to effect the further supply of fluid under pressure from the supply reservoir 34 to the train pipe 23 to reestablish the predetermined floating pressure maintained by the regulator 24. Upon the increase in pressure in the train pipe 23 the piston 48 of the controller device 19 is moved toward the left to its illustrated or mid position, the pinion 42 and the contact member 38 being actuated in a counterclockwise direction to their illustrated positions.

If, on the other hand, the operator wishes to make a complete stop and thus leaves the controller handle 192 in its brake applying position, the braking force caused by the dynamic braking circuit will decrease as the vehicle speed decreases, thus causing the pendulum 187 of the retardation controller device to be moved toward the right sufficiently to separate the contact members 196 and 195 and interrupt the above traced circuit through the winding of the release magnet valve device 27 to permit a further reduction in pressure in the train pipe 23 to thus permit a further movement of the piston 48 toward the right and a further clockwise movement of the contact member 38 to cut out more of the resistance 37 from the dynamic braking circuit in order to increase the dynamic braking force.

The equipment is so designed that the piston 48 and the contact member 38 reach the limit of their clockwise travel at some predetermined train pipe pressure, say twenty pounds, at which pressure the pressure operated switch device 32 is designed to actuate the contact member 172 to interrupt the holding circuit through the winding of the relay 29 and the winding of the magnet 98 of the transfer magnet valve device 28. The other energizing circuit for these two devices through the controller 25 having been previously interrupted by separation of the contact member 229 from the conducting segment 204 upon movement of the controller drum to a brake applying position, they remain deenergized at this time. Upon deenergization of the relay 29 the contact members 235 and 236 drop to their circuit interrupting positions, the contact member 235 thus preventing reenergization of the relay 29 and of the magnet 98 upon an increase in train pipe pressure and the closing of the switch contact member 172 so that these devices are not again energized until the controller drum 193 is moved to release position. The relay contact member 236 interrupts the above traced circuit through the winding of the dynamic braking contactors 75 and 76, causing these contactors to drop to their illustrated or circuit interrupting positions. The asymmetric rectifier unit or one way electric valve 250, however, provides a short-circuiting path, effective only after power is interrupted to delay the deenergization of the windings of the dynamic braking contactors 75 and 76 so as to retain the dynamic braking circuit for a short time while the pneumatic brakes are applying in a manner to be presently described.

Upon the deenergization of the magnet 98 of the transfer magnet valve device 28, as above described, the double beat valve 95 is forced upwardly to its upper seat, thus closing communication from the supply reservoir 34 to the piston chamber 102 of the relay valve device, and opening communication from the piston chamber 102 through chambers 93 and 96 to the train line pipe 23, to permit the pressure within the piston chamber 102 to drop to that corresponding to train pipe pressure.

This reduction in pressure within the piston chamber 102 from supply reservoir pressure to the now lowered train pipe pressure causes the connected pistons 103 and 107 to be forced upwardly by the spring 114, the stem 104 and the pivot pin 117 carrying the arm 118 therewith. The right hand end of the lever 116 fulcrums between the fulcrum member 165 and the plunger 159 that is held in its illustrated position by the spring 157, the left hand end of the lever 116 forcing first the pilot release valve 123 and subsequently the main release valve 124 to their respective seats upon upward movement of the end 118 of the lever.

In this position of the pistons 103 and 107 and the stem 104, the pilot and main release valves 123 and 124, respectively, and also the pilot and main supply valves 154 and 144, respectively, are all in lap position. Upon a slight further upward movement of the pistons 103 and 107 the arm 118 rocks about the plunger 122 the right hand end of the arm forcing the plunger 159 upwardly to unseat the pilot supply valve 154 against the bias of the spring 157 and effect a rapid release of fluid under pressure from the chamber 149 into the pressure chamber 108, thus unloading piston 145 permitting plunger 159 to force the piston 145 upwardly against the bias of the spring 156 and unseat the main supply valve 144 to effect the supply of fluid under pressure from the supply reservoir 34 to the pressure chamber 108, and therefrom through the brake cylinder pipe 109 to the brake cylinders 17 and 18 to effect a pneumatic application of the brakes.

As the pressure within the pressure chamber 108 and within the brake cylinders 17 and 18 builds up, the force of the pressure on the piston 107 acting against the spring 114 will move the pistons 103 and 107 downwardly to effect a predetermined relation between the pressure in the piston chamber 102 and that in the pressure chamber 108, the pressure within the pressure chamber 108 increasing as the pressure within the piston chamber 102 decreases so that the sum of the downward forces on the pistons 103 and 107 balances the upward force of the spring 114.

The brake cylinder pressure will continue to increase until the braking force caused thereby effects a rate of retardation of the vehicle that is sufficient that the pendulum 187 of the control device is moved forwardly sufficiently that the lug 199 engages the contact member 196 and moves it forwardly into engagement with the contact member 195 to close the above traced circuit through the winding of the release magnet valve device 27 to force the release valve 87 to its seat and prevent further reduction in pressure in the train pipe 23. If the initial degree of application of the fluid pressure brakes is sufficient to cause a rate of retardation of the vehicle greater than that desired for the particular position of the handle 192 and of the switch assembly 189, the pendulum 187 will move forward sufficiently to cause engagement between the contact members 195 and 194 to close the above traced circuit through the winding of the admission magnet valve device 26, to force the admission valve 81 downwardly from its seat and permit the flow of fluid under pressure from the supply reservoir 35 to the train pipe 23 to increase the pressure therein and in the piston chamber 102 of the relay valve device 22, thus causing the pistons 103 and 107 to move downwardly, and again effect the rotation of the lever 116 about the fulcrum member 165, the left end 118 of the lever positioned between the shoulders 128 and 129 moving the plunger 122 and the pilot valve 123 downwardly from its seat and permitting the flow of fluid under pressure from the chamber 108 through the bore 137 in the stem 132 and the space between the release valve 124 and the piston 135, thus equalizing the pressure on the two sides of the valve 124. At the same time the main release valve 124 is actuated from its seat by the pilot valve stem 138 and the head 139 which engages the face of the piston 135, thus permitting the release of fluid under pressure from the pressure chamber 108 and from the brake cylinders 17 and 18 past the unseated release valve 124 to the atmosphere through the passage 142 to thus decrease brake cylinder pressure. When the pressure in the brake cylinder and in the pressure chamber 108 has decreased sufficiently, the reduction in pressure in the chamber 108 permits the spring 114 to again force the pistons 107 and 103 and the connecting stem 104 upwardly sufficiently to cause the seating of the pilot release valve 123 and the main release valve 124 to maintain sufficient brake cylinder pressure to effect the desired rate of retardation of the vehicle.

As the rate of retardation of the vehicle increases upon the slowing down of the vehicle, the pendulum 187 will again swing to the left and actuate the relay valve device 22 in the manner just described to further reduce brake cylinder pressure to maintain the desired rate of retardation of the vehicle throughout the stop.

The relay valve device 22 is so designed that a predetermined relation exists between the pressure in the piston chamber 102 and brake cylinder pressure. For example, in the embodiment of the invention described it is assumed that the normal or floating pressure within the train pipe 23 is fifty pounds, and that the area of the piston 107 is approximately one-half of the area of the piston 103, and that the force of the spring 114 is such as to balance forty-five pounds pressure in the piston chamber 102 so that for pressures above forty-five pounds the pistons 103 and 107 will be in their lower or illustrated positions, thus effecting communication between the brake cylinders 17 and 18 and atmosphere past the unseated main release valve 124. As the pressure in the piston chamber 102 decreases from forty-five pounds to zero the pressure in the pressure chamber 108 and in the brake cylinders 17 and 18 may increase from zero to ninety-five pounds, corresponding to full brake cylinder pressure.

It will be apparent that the amount of retardation of the vehicle required to effect the operation of the switch assembly 189 of the controller 25 is dependent upon the amount of movement of the handle 192 from the mid or illustrated position, thus determining the amount of movement of the inertia element or pendulum 187 from the vertical position to cause engagement of the lug 199 with the switch contact member 196, the greater movement from the vertical position requiring the greater swing of the pendulum, and, consequently, the greater rate of retardation of the vehicle necessary to effect operation of the switch assembly 189 to limit or decrease the degree of application of the brakes.

In the case of trolley failure, i. e. upon failure of the source of electric power, the winding of the contactor 206 will be deenergized permitting the contact member 215 thereof to drop to its circuit interrupting position to deenergize the windings of the relay 29 and of the magnet 98 of the transfer valve device 28. The transfer valve device 28, thus deenergized, operates to connect the piston chamber 102 to the train pipe 23, so that a reduction in train pipe pressure below the floating value of fifty pounds will cause operation of the relay valve device 22 to effect a corresponding fluid pressure application of the brakes. It will thus be seen that, in the case of trolley failure which may in some cases render the electric brakes ineffective, the fluid pressure brakes are applied upon the initial reduction in train pipe pressure below its floating value, instead of requiring a sufficient reduction in pressure to cause operation of the pressure operated switch 32.

If the vehicle is at rest, and the parts are in the positions illustrated in Fig. 1, and the operator desires to start the vehicle the handle 192 is moved forwardly or in a counterclockwise direction as illustrated in Fig. 1. The switch assembly 189 is thus moved toward the right, the switch contact members 196, 195 and 194 remaining in engagement by virtue of the pressure of the lug 199 against the switch contact member 196. The simultaneous movement of the drum 193 interrupts the control of the pressure in the train pipe 23 by the pressure regulating device 24 by separation of the drum contact segments 202 and 203 from the contact members 218 and 225, respectively, through which the circuits controlled by the pressure regulating device 24 are completed. The above traced circuit from the positive terminal of the battery 205, through the switch contact members 196, 195 and 194 of the switch assembly 189 and the contact members 239 and 226 of the drum controller, and the winding of the magnet 83 of the admission magnet valve device 26 causes the admission valve 81 to be forced downwardly from its seat to effect the supply of fluid under pressure from the supply reservoir pipe 35 to the train pipe 23 to raise the train pipe pressure above the floating or fifty pounds pressure. At the same time, the engagement of contact 237 with segment 202 maintains the release magnet valve 27 energized, through contacts 195 and 196, so that valve 87 remains seated to close communication between the train pipe 23 and the atmosphere.

This increase in pressure in the pipe 23 and in the piston chamber 47 of the regulating device 19 causes the piston 48 and the stem 45 to be moved toward the left as viewed in the drawing, the lug 52 actuating the toggle mechanism to its illustrated position to effect engagement of contact members 65 and 66.

A circuit is thus completed from the positive terminal of the battery 205 through conductor 216, contact member 228, the drum controller conducting segment 204, contact member 253, conductor 254, the windings of the power contactors 74, 73 and 72, conductor 255, switch contact members 65 and 66, and by conductor 223 to the negative terminal of the battery 205, thus energizing the power contactors 72, 73 and 74 and actuating them to their circuit closing positions. A power circuit is thus completed from the trolley 256 through contactor 74, conductor 257 to the junction point 12, and from the junction point 12 through two parallel circuits, one circuit leading through the field windings 8 and 7 and the armature windings 6 and 5 to the junction point 9, the other circuit leading from the junction point 12 through armature windings 16 and 15 and the field windings 14 and 13 to the junction point 9, the circuit being completed from the junction point 9 through power contactor 72, conductor 248, contact member 38 on arm 39 of the rheostat, through rheostat resistor 37, conductor 249, the contact members of the power contactor 73 to ground at 258.

As the pressure within the train pipe 23 continues to increase the piston 48 is forced farther toward the left against the bias of the spring 49, the stem 45 and rack 44 being correspondingly moved toward the left, the teeth in the rack 44 engaging the teeth of the pinion 42 to cause the arm 39 of the rheostat to be moved in a clockwise direction to gradually cut portions of the resistance 37 from the motor circuit to increase the acceleration of the vehicle. As the rate of acceleration of the vehicle increases to a predetermined value, depending upon the position of the handle 192 and of the switch assembly 189, the pendulum 187 will swing sufficiently to the right that the pressure exerted by the lug 199 on the contact member 196 will permit the switch contact member 195 to move sufficiently toward the right to separate from the contact member 194, which is held by the stop 197, to effect the interruption of the above traced circuit through the winding of the magnet 83 of the admission magnet valve devices 26 of the several train units, thus preventing a further increase in the pressure in the train line pipe 23 and further movement of the rheostat arm 39.

Should the rate of acceleration of the vehicle become sufficient to cause the pendulum 187 to move still further toward the right the lug 199 may release pressure on the switch member 196 sufficiently to permit separation between the switch member 196 and the switch member 195, which will then be held by the stop 198, thus interrupting the above traced circuit through the winding of the magnet 89 of the release magnet valve device 27 to effect a reduction in pressure in the train pipe 23 until the rate of acceleration of the vehicle has decreased sufficiently to again cause engagement of the switch contact members 195 and 196. As the rate of acceleration of the vehicle decreases the pendulum 187 will move toward the vertical position sufficiently to again cause engagement of the several switch contact members 196, 195 and 194 to again energize the windings of the release magnet valve devices 27 and the admission magnet valve devices 26 to again increase the pressure within the train pipe 23 and cause the further movement of the piston 48 and of the rack 44 toward the left to cut out more of the resistance 37 from the motor circuit.

Summarizing, it will be seen that the system may be so designed that an increase in pressure in the train pipe 23 from fifty to eighty pounds causes the complete movement of the piston 48 and of the arm 39 to cut out the entire resistance 37 from the motor circuit during acceleration of the vehicle motors, and upon a reduction from fifty to twenty pounds pressure in the train pipe 23 to cut out the entire resistance 37 from the dynamic braking circuit during retardation of the vehicle. As the train pipe pressure reduces to a value corresponding to the complete cutting out of the resistance 37 from the dynamic braking circuit, the fluid pressure operated switch device 32 is actuated by the spring 173 to a circuit interrupting position to effect the pneumatic application of the brakes in the manner above described.

While one embodiment of the invention has been illustrated and described it will be apparent to those skilled in the art that many changes in the details of apparatus and circuits illustrated may be made without departing from the spirit of my invention and I do not wish to be limited otherwise than by the scope of the appended claims.

Having now described my invention, what I claim as new and desire to secure by Letters Patent is:

1. In a propulsion and brake control equipment for vehicles, in combination, propulsion means for the vehicle, braking means for the vehicle, automatic means for controlling a supply of fluid under pressure to develop a predetermined pressure corresponding to the idling of said propulsion means and the release of said braking means, manually operable means for varying the pressure in the one or the other direction from said predetermined value to effect an application of the brakes or an acceleration of the vehicle, and inertia means responsive to the rate of change in the vehicle speed for controlling the acceleration or deceleration of the vehicle in accordance with the amount of movement of said manually operable means from its idling or release position.

2. In a propulsion and brake control equipment for vehicles, in combination, propulsion means for the vehicle, braking means for the vehicle, automatic means for controlling a supply of fluid under pressure to develop a predetermined pressure corresponding to the idling of said propulsion means and the release of said braking means, manually operable means for effecting the development of pressure that is higher or lower than said predetermined pressure, means responsive to the degree of variation in pressure from said predetermined value to effect a corresponding degree of application of the brakes upon a decrease in pressure and to effect a corresponding acceleration of the vehicle upon an increase in pressure from said predetermined value, and inertia means responsive to the rate of change in the speed of the vehicle for controlling the amount of variation in the developed pressure from said predetermined value in accordance with the amount of movement of said manually operable means from its idling or release position.

3. In a brake equipment for vehicles, in combination, a plurality of braking means, a pipe normally charged with fluid under pressure to a predetermined pressure, means for effecting a reduction in pressure below said predetermined value to effect the application of one of said braking means, means responsive to the rate of retardation of the vehicle for controlling the pressure in said pipe to effect a desired rate of retardation of the vehicle, means responsive over a predetermined pressure range for controlling the degree of application of one of the braking means upon a continuing reduction in pressure in said pipe, and means responsive to a further predetermined reduction in pressure to effect the application of another of said braking means.

4. In a brake equipment for vehicles, in combination, an electric braking means for developing a braking torque on the vehicle wheels, a fluid pressure braking means, a pipe normally charged with fluid under pressure to a predetermined value, manually operated means for effecting a reduction in the pressure below said predetermined value to effect the application of one of said braking means, means responsive to the rate of retardation of the vehicle for controlling the pressure in said pipe to effect a desired rate of retardation in the vehicle in accordance with the amount of movement of said manually operable means from its release position, means responsive over a predetermined range below said predetermined value for controlling the degree of application of said electric braking means, and means responsive to a further reduction in said pressure for effecting the application of said fluid pressure braking means.

5. In a brake equipment for vehicles, in combination, an electric braking means for developing a braking torque on the vehicle wheels, a fluid pressure braking means, a pipe normally charged with fluid under pressure to a predetermined value, manually operable means for effecting a reduction in pressure below said predetermined value to effect an application of the brakes, means responsive to the rate of retardation of the vehicle for controlling the pressure in said pipe to effect a desired rate of retardation of the vehicle in accordance with the amount of movement of said manually operable means from its release position, means responsive within a predetermined pressure range below said predetermined value for controlling the degree of application of said electric braking means, means responsive to a further reduction in said pressure for effecting the application of the fluid pressure braking means and the release of said electric braking means, and means thereafter responsive to said pressure for controlling the degree of application of said fluid pressure braking means in accordance with the pressure below said predetermined value.

6. In a brake equipment for vehicles, in combination, an electric braking means for developing a braking torque on the vehicle wheels, a fluid pressure braking means, a pipe normally charged with fluid under pressure to a predetermined value, a manually operable brake controller, regulating means operative when the brake controller is in release position for controlling the flow of fluid under pressure to and from said pipe to maintain a predetermined pressure therein, a pressure operated device operated in accordance with the reduction in pressure in said pipe below said predetermined pressure for controlling said electric braking means, a relay valve device operative to control said fluid pressure braking means, and means responsive to a predetermined reduction in the pressure in said normally charged pipe for operatively connecting said relay valve device to be operated in accordance with the pressure in said pipe, and an inertia device operated in accordance with the retardation of the vehicle for controlling the pressure in said normally charged pipe.

7. In a propulsion and brake control equipment for vehicles, in combination, electric driving motors for the vehicle, a train pipe, automatic means for regulating the pressure in said train pipe to maintain a predetermined constant pressure therein, manually operable means for effecting an increase or decrease in the pressure in said pipe above or below said predetermined pressure, a pressure operated motor controller device including a rheostat for controlling said motors and an abutment operatively connected thereto and subject on one side to the pressure in said train pipe, said controller device being so arranged so as to maintain said rheostat in its all-in position when the pressure in said train pipe is maintained at said predetermined pressure, and subject upon an increase in pressure above said predetermined pressure to actuate said rheostat toward its all-out position to control the supply of power to said motors, and subject upon a decrease in pressure below said predetermined pressure to actuate said rheostat toward its all-out position to control the flow of dynamic braking current from said motors.

8. In a propulsion and brake control equipment for vehicles, in combination, electric driving motors for the vehicle, a train pipe, automatic means for regulating the pressure in said train pipe to maintain a predetermined pressure therein, manually operable means for effecting an increase or decrease in pressure in said train pipe above or below said predetermined pressure, a pressure operated motor control device including a rheostat for controlling said motors and an abutment operatively connected thereto and subject on one side to the pressure in said train pipe, said control device being so arranged as to maintain said rheostat in its all-in position when the pressure in said train pipe is maintained at said predetermined value, and subject upon an increase in pressure above said predetermined value to actuate said rheostat toward its all-out position to control the supply of power to said motors, and subject upon a decrease in pressure below said predetermined pressure to actuate said rheostat toward its all-out position to control the flow of dynamic braking current from said motors, and inertia responsive means operated in accordance with the rate of change of said vehicle speed for controlling the train pipe pressure to limit the acceleration or deceleration of the vehicle.

9. In a propulsion and brake equipment for vehicles, in combination, electric driving motors for the vehicles, a train pipe, automatic means for regulating the pressure in said train pipe to maintain a predetermined pressure therein, a pressure operated motor control device including a rheostat for controlling said motor and an abutment operatively connected thereto and subject on one side to the pressure in said train pipe, said control device being so arranged as to maintain said rheostat in its all-in position when the pressure in said train pipe is maintained at said constant predetermined value, and subject upon an increase in pressure above said predetermined value to actuate said rheostat toward its all-out position to control the supply of power to said motors, and subject upon a decrease in pressure below said predetermined value to actuate said rheostat toward its all-out position to control the flow of dynamic braking current from said motors, manually operable means for interrupting the control of said automatic means and for effecting an increase or decrease in the pressure in said train pipe in accordance with the movement thereof in the one or the other direction from a motor idling or brake releasing position, and inertia responsive means operative in accordance with the rate of change in the speed of the vehicle for controlling the train pipe pressure to limit the acceleration or deceleration of the vehicle.

10. In a propulsion and brake control equipment for vehicles, in combination, electric driving motors for the vehicles, a train pipe, pressure regulating means comprising magnet valve devices and pressure actuated control means therefor normally operated for maintaining a predetermined pressure in said train pipe, a pressure operated controller device including a rheostat subject to train pipe pressure and arranged to connect said motors to a source of power with said rheostat in circuit therewith upon an increase in said train pipe pressure above said predetermined value and to thereafter decrease the rheostat resistance upon a continuing increase in pressure, and to connect said rheostat to said motor to form a dynamic braking circuit with the rheostat resistance all in the circuit upon a reduction in train pipe pressure below said predetermined value, and to gradually cut said resistance from said circuit upon a continuing decrease in train pipe pressure, manually operable control means for interrupting the control of said magnet valve devices by said pressure regulator and for effecting a variation in pressure from said predetermined pressure, and inertia means responsive to the rate of change in speed of the vehicle for controlling said magnet valve devices to limit the rate of change in pressure from said predetermined value.

11. In a propulsion and brake control equipment for vehicles, in combination, a fluid pressure braking means, electric driving motors for vehicles, a train pipe, pressure regulating means comprising magnet valve devices and pressure actuated control means therefor normally operative for maintaining a predetermined pressure in said train pipe, a pressure operated controller device including a rheostat subject to train pipe pressure and arranged to connect said motors to a source of power with said rheostat in its all-in position upon an increase in said train pipe pressure above said predetermined pressure and to thereafter decrease rheostat resistance upon continuing the increase in pressure, and to connect said rheostat to said motors to form a dynamic braking circuit with the rheostat resistance in the circuit upon a reduction in train pipe pressure below said predetermined value and to gradually cut said resistance from said circuit upon a continuing decrease in pressure, manually operable control means for interrupting the control of said magnet valve devices on said pressure regulator and for effecting a variation in pressure from said predetermined pressure, inertia means responsive to the rate of change in speed in the vehicle for controlling said magnet valve devices to limit the rate of change in pressure from said predetermined value, and means comprising a magnet valve device and a pressure operated switch operated upon a predetermined reduction in pressure in said train pipe for effecting the application of the fluid pressure braking means.

12. In a brake equipment for vehicles, in combination, fluid pressure braking means, dynamic braking means, a train pipe, pressure regulating means comprising magnet valve devices and pressure actuated control means therefor normally operative for maintaining a predetermined pressure in said train pipe, manually operable control means for interrupting the control of said magnet valve devices by said pressure regulator and for effecting a variation in pressure from said predetermined pressure, inertia means responsive to the rate of change in speed in the vehicle for controlling said magnet valve devices to limit the rate of change in pressure from said predetermined value, means responsive over a predetermined pressure range for increasing the degree of application of one of said braking means upon a continuing reduction in pressure in said pipe below said predetermined value, and means responsive to a predetermined low value of pressure in said pipe to effect the application of the other of said braking means.

13. In a control equipment for vehicles, in combination, fluid pressure braking means, electric driving motors for the vehicles, a train pipe, pressure regulating means comprising magnet valve devices and pressure actuating control means therefor normally operative for maintaining a predetermined pressure in said train pipe, manually operable control means for interrupting the control for said devices by said pressure regulator and for effecting a variation in pressure from said predetermined value, and inertia means responsive to the rate of change of speed in the vehicle for controlling said magnet valve devices to limit the rate of change of train pipe pressure from said predetermined value, means responsive over a predetermined pressure range below said predetermined value for connecting said motors in a dynamic braking circuit and for controlling the degree of dynamic braking, and means responsive to a further reduction in said pressure for effecting the application of said fluid pressure braking means.

14. In a brake equipment for vehicles, a fluid pressure braking means, an electric braking means for developing a braking torque on the vehicle wheels, a train pipe, a pressure regulating means comprising magnet valve devices and pressure actuated control means therefor normally operative for maintaining a predetermined pressure in said train pipe, manually operable means for effecting a variation in pressure from said predetermined pressure, a pressure operated controller subject to train pipe pressure for effecting application of the electric braking means in accordance with the reduction in pressure in said train pipe below said predetermined pressure, and means subject to train pipe pressure for applying said fluid pressure braking means upon a eduction in train pipe pressure below a predetermined value.

15. In a brake equipment for vehicles, a fluid pressure braking means, an electric braking means for developing a braking torque on the vehicle wheels, a train pipe, a pressure regulating means comprising magnet valve devices and pressure actuated control means therefor normally operative for maintaining a predetermined pressure in said train pipe, manually operable means for effecting a reduction in pressure below said predetermined pressure, a relay valve device for controlling the application of the fluid pressure braking means in accordance with a decrease in pressure of fluid supplied thereto below said predetermined train pipe pressure, means for normally supplying fluid under pressure to said relay valve device above said predetermined pressure, a pressure operated controller subject to train pipe pressure for effecting application of the electrical braking means in accordance with the reduction in pressure in said train pipe, and means subject to a predetermined reduction in train pipe pressure below said predetermined pressure for interrupting the normal supply of fluid under pressure to said relay valve device and for supplying fluid under pressure thereto at train pipe pressure.

16. In a brake equipment for vehicles, in combination, a brake cylinder, an electric braking means, a train pipe normally charged with fluid under pressure to a predetermined pressure, means for controlling the decrease in pressure in said train pipe below said predetermined pressure to control a desired degree of braking, automatic means operative over a predetermined range of train pipe pressure for effecting a degree of application of the electric braking means in accordance with the reduction in pressure below said predetermined value, means for effecting a supply of fluid under pressure to said brake cylinder over a predetermined pressure range of train pipe pressure extending below the value necessary to effect maximum application of the electric braking means, and means responsive to the rate of retardation of the vehicle for limiting the total braking by said electric braking means and said brake cylinder.

17. In a brake equipment for vehicles, in combination, a brake cylinder, an electric braking means, means for controlling the supply of fluid under pressure to effect a reduction in pressure below a predetermined value corresponding to the desired degree of braking, automatic means operative over a predetermined range of pressure for effecting a degree of application of the electric braking means in accordance with the amount of reduction of pressure below said predetermined pressure and arranged to effect a maximum application thereof appreciably above the minimum pressure, and means for effecting the supply of fluid under pressure to said brake cylinder over a predetermined range of pressure extending from below the value necessary to effect maximum application of the electric braking means.

18. In a control equipment for vehicles, in combination, driving motors for said vehicle, a plurality of braking means, a train pipe normally charged with fluid under pressure to a predetermined value, means for effecting an increase in train pipe pressure above said predetermined value and a reduction in train pipe pressure below said predetermined value, means responsive to an increase of the pressure in the train pipe to effect the propulsion of the vehicle by said motors and responsive to a reduction in train pipe pressure below said predetermined value for effecting operation of one of said braking means to provide a braking effect in accordance with the reduction in train pipe pressure below said predetermined value, means responsive to a predetermined reduction in train pipe pressure for controlling another of said braking means, and means responsive to the rate of retardation of the vehicle for limiting the degree of application of said several braking means to limit the rate of retardation of the vehicle to a desired amount.

19. In a control equipment for vehicles, in combination, driving motors for said vehicle, a plurality of braking means, a train pipe normally charged with fluid under pressure to a predetermined value, means responsive to an increase in train pipe pressure above said predetermined value to effect the propulsion of the vehicle by said driving motors and to a reduction in train pipe pressure below said predetermined value for effecting operation of one of said braking means to produce a braking effect in accordance with the reduction in train pipe pressure below said predetermined value, and means responsive to a predetermined reduction in train pipe pressure for controlling another of said braking means to produce a braking effect in accordance with a further reduction in train pipe pressure below said predetermined value.

20. In a control equipment for vehicles, in combination, vehicle driving motors, a control rheostat and pressure responsive actuating means therefor, said pressure responsive means comprising a movable abutment subject on one side to a control pressure and on the other side to an opposing force, and adapted upon an increase or decrease in said control pressure from a predetermined value to move said abutment from a predetermined position in one or the other direction to actuate said rheostat from its all-in position toward its all-out position an amount depending upon the amount of change in control pressure from said predetermined value, switching means also controlled by said pressure responsive means and operable upon movement of said abutment in one direction from said predetermined position to close a dynamic braking circuit for said motors and upon movement in the other direction from said predetermined position to close a power circuit for said motors.

21. In a control equipment for vehicles, in combination, vehicle driving motors, a control rheostat and pressure responsive actuating means therefor, said pressure responsive means comprising a movable abutment subject on one side to a control pressure and on the other side to an opposing force, and adapted upon an increase or decrease in said control pressure from a predetermined value to move said abutment from a predetermined position in the one or the other direction to actuate said rheostat from its all-in position toward its all-out position an amount depending upon the amount of change in control pipe pressure from said predetermined value, switching means also controlled by said pressure responsive means and operable upon movement of said abutment in one direction from said predetermined position to close a dynamic braking circuit for said motors and upon movement in the other direction from said predetermined position to close a power circuit for said motors, and manually operable means for also controlling said dynamic braking circuit and said power circuit and for effecting an increase or decrease in said control pressure from said predetermined value upon movement in the one or the other direction from said predetermined position.

22. In a control equipment for vehicles, in combination, vehicle driving motors, a control rheostat and pressure responsive actuating means therefor, said pressure responsive means comprising a movable abutment subject on one side to a control pressure and on the other side to an opposing force and adapted upon an increase or decrease in said control pressure from a predetermined value to move said abutment from a predetermined position in the one or the other direction to actuate said rheostat from its all-in position toward its all-out position an amount depending upon the amount of change in control pipe pressure from said predetermined value, switching means also controlled by said pressure responsive means and operable upon movement of said abutment in one direction from said predetermined position to close a dynamic braking circuit for said motors and upon movement in the other direction from said predetermined position to close a power circuit for said motors, manually operable means for also controlling said dynamic braking circuit and said power circuit and for effecting an increase or decrease in said control pressure from said predetermined value upon movement in the one or the other direction from a predetermined position, and inertia means responsive to the rate of change in vehicle speed for governing the control pressure to limit the rate of change in vehicle speed to a desired value in accordance with the amount of movement of said manually operable means from said predetermined position.

23. In a control equipment for vehicles, in combination, vehicle driving motors, a control rheostat and pressure responsive actuating means therefor, said pressure responsive means comprising a movable abutment subject on one side to a control pressure and on the other side to an opposing force and adapted upon an increase or decrease in said control pressure from a predetermined value to move said abutment from a predetermined position in the one or the opposite direction to actuate said rheostat from its all-in position toward its all-out position an amount depending upon the amount of change in control pressure from said predetermined value, switching means also controlled by said pressure responsive means operable upon movement of said abutment in one direction from said predetermined position to close a dynamic braking circuit for said motors and upon movement in the other direction from said predetermined position to close a power circuit for said motors, a pressure regulating device for automatically maintaining said predetermined control pressure, and manually operable means for effecting an increase or decrease in said control pressure from said predetermined value upon movement in the one or an opposite direction from a predetermined position.

24. In a control equipment for vehicles, in combination, vehicle driving motors, a control rheostat and pressure responsive actuating means therefor, said pressure responsive means comprising a movable abutment subject on one side to a control pressure and on the other side to an opposing force and adapted upon an increase or decrease in said control pressure from a predetermined value to move said abutment from a predetermined position in the one or the opposite direction to actuate said rheostat from its all-in position toward its all-out position an amount depending upon the amount of change in control pressure from said predetermined value, switching means also controlled by said pressure responsive means operable upon movement of said abutment in one direction from said predetermined position to close a dynamic braking circuit for said motors and upon movement in the other direction from said predetermined position to close a power circuit for said motors, a pressure regulating device for automatically maintaining said predetermined control pressure, manually operable means for also controlling said dynamic braking circuit and said power circuit and for effecting an increase or a decrease in said control pressure from said predetermined value upon movement in the one or the opposite direction from a predetermined position, and inertia means responsive to the rate of change in vehicle speed for governing the control pressure to limit the rate of change in vehicle speed to a desired value in accordance with the amount of movement of said manually operable means from said predetermined position.

25. In a propulsion and brake control equipment for vehicles, in combination, propulsion means for the vehicle, braking means for the vehicle, means for controlling a supply of fluid under pressure to develop a predetermined pressure corresponding to idling of said propulsion means and the release of said braking means, means for effecting an application of the brakes upon a variation in pressure from said predetermined value in one direction and for effecting the supply of power to said motors upon a variation in pressure from said predetermined value in the other direction, and means for controlling the rate of change in vehicle speed in either direction in accordance with the amount of variation in pressure from said predetermined value.

26. In a brake equipment for vehicles, in combination, a plurality of braking means, automatic means for controlling supply of fluid under pressure to develop a predetermined pressure corresponding to the release of the braking means, manually controlled means for effecting a reduction in pressure below the predetermined value an amount corresponding to the desired degree of braking, means for effecting the operation of one of said braking means in accordance with the amount of reduction in pressure below the predetermined value over a predetermined pressure range, means responsive to a further predetermined reduction in the pressure beyond said pressure range for effecting the application of another of said braking means and the release of said first named braking means, and means for delaying the release of said first named braking means sufficiently to permit a partial application of said second named braking means to provide a smooth transition from the one to the other of said braking means.

27. In a brake equipment for vehicles, in combination, an electric braking means for developing a braking torque on the vehicle wheels, a fluid pressure braking means, a pipe normally charged with fluid under pressure to a predetermined value, manually operated means for effecting a reduction in pressure below said predetermined value to effect the application of one of said braking means, means responsive to the rate of retardation of the vehicle for controlling the pressure in said pipe to effect a desired rate of retardation of the vehicle in accordance with the amount of movement of said manually operable means from its release position, means responsive over a predetermined range of pressure below said predetermined value for controlling the degree of application of said electric braking means, means responsive to further reduction of the pressure in said pipe below said range for effecting the application of said fluid pressure braking means and the release of said electric braking means, and means for delaying the release of said electric braking means a sufficient length of time to permit a partial application of said fluid pressure braking means to provide a smooth transition from the one to the other of said braking means.

28. In a brake equipment for vehicles, in combination, an electric braking means for developing a braking torque on the vehicle wheels, a fluid pressure braking means, a pipe normally charged with fluid under pressure to a predetermined value, manually operable means for effecting a reduction in pressure below said predetermined value to effect an application of the brakes, means responsive to a predetermined pressure range below said predetermined value for controlling the degree of application of said electric braking means, means responsive within a second predetermined range below said first named pressure range for effecting the application of the fluid pressure braking means and the release of said electric braking means, and means for preventing the subsequent reapplication of said electric braking means and the release of said fluid pressure braking means upon an increase in said pressure to said first named pressure range until said manually operable means has been moved to a brake releasing position.

29. In a brake equipment for vehicles, in combination, an electric braking means for developing a braking torque on the vehicle wheels, a fluid pressure braking means, a pipe normally charged with fluid under pressure to a predetermined value, manually operable means for effecting a reduction in pressure below said predetermined value to effect an application of the brakes, means responsive to the rate of retardation of the vehicle for controlling the pressure in said pipe to effect a desired rate of retardation of the vehicle in accordance with the amount of movement of said manually operable means from its release position, means responsive within a predetermined pressure range below said predetermined value for controlling the degree of application of said electric braking means, means responsive within a second predetermined pressure range below said first named pressure range for effecting the release of said electric braking means and the application of said fluid pressure braking means, and means for preventing a subsequent reapplication of said electric braking means and the release of said fluid pressure braking means upon an increase in said pressure to a value within said first named pressure range until movement of said manually operable means to its release position.

30. In a brake equipment for vehicles of the type driven by electric power, in combination, an electric braking means for developing a braking torque on the vehicle wheels, a fluid pressure braking means, automatic means for controlling the supply of fluid under pressure to develop a predetermined pressure corresponding to the release of said braking means, manually controlled means for effecting a reduction in pressure below the predetermined value an amount corresponding to the desired degree of braking, means for effecting the application of said electric braking means in accordance with the amount of reduction in pressure below the predetermined value over a predetermined pressure range, means responsive to a further predetermined reduction in the pressure beyond said pressure range for effecting the degree of application of said fluid pressure braking means over a second predetermined pressure range, and means responsive to failure of the electric power supply for effecting application of said fluid pressure braking means over said first named pressure range.

31. In a vehicle control system, in combination, vehicle drive motors, fluid pressure brake means, a control pipe, means for maintaining a fluid in said pipe at a substantially constant pressure value, means operated upon an increase of pressure in said control pipe above said constant pressure value for effecting a supply of power to said drive motors to propel the vehicle, and means operated upon a decrease of pressure in said control pipe below said constant pressure value for first connecting said drive motors in a dynamic braking circuit and maintaining said motors so connected over a predetermined range of decreasing pressures in said control pipe, and for then subsequently effecting an application of said fluid pressure brake means over a still lower range of decreasing pressures in said control pipe.

32. In a vehicle control system, in combination, vehicle drive motors, fluid pressure brake means, a control pipe, means for maintaining a substantially constant fluid pressure in said control pipe, means operated upon a variation of pressure in said control pipe above said substantially constant pressure for connecting said drive motors to a source of electric power to propel the vehicle, and operable upon a variation of pressure in said control pipe below said substantially constant pressure for connecting said drive motors in a dynamic braking circuit to produce a braking effect on the vehicle, means operable only upon the reduction of pressure in said control pipe below said substantially constant pressure to a predetermined value to effect an application of said fluid pressure brake means, and means operable upon failure of the said source of electric power for conditioning said fluid pressure brake means to become operative upon an initial reduction in control pipe pressure and before said pressure is reduced to said predetermined value.

33. In a vehicle braking system, in combination, an electric braking means, fluid pressure braking means, a normally charged pipe, means operated upon a reduction of pressure in said normally charged pipe over a predetermined range immediately below its normally charged pressure value for effecting an application of said electric braking means, a relay valve device operated upon a decrease of pressure therein for effecting an application of said fluid pressure brake means, and means operated at a pressure which is below said aforementioned pressure range for connecting said relay valve device to said normally charged pipe to effect a pressure reduction in said relay valve device.

34. In a vehicle propulsion system, in combination, vehicle drive motors, a normally charged pipe, manually controlled means for controlling the pressure in said pipe, inertia operated means for also controlling the pressure in said pipe, and means responsive to variations of pressure in said pipe for controlling the operation of said drive motors to propel the vehicle.

35. In a vehicle propulsion system, in combination, vehicle drive motors, a normally charged pipe, means operated upon variation of pressure in said pipe for controlling the operation of said drive motors, a manually operated controller device having a release position and a plurality of other positions for controlling the variation of pressure in said pipe, and pressure regulating means operative so long as said controller device is in said release position for maintaining the pressure in said pipe at a substantially constant value.

36. In a vehicle propulsion system, in combination, vehicle drive motors, a set of electric circuits, means controlled according to the energization and deenergization of said circuits for controlling the operation of said drive motors to propel the vehicle, manually operated means for controlling the energization and deenergization of said circuits, and inertia operated means for also controlling the energization and deenergization of said circuits.

37. In a vehicle propulsion system, in combination, vehicle drive motors, a normally charged pipe, means responsive to a variation of pressure in said pipe for controlling the operation of said drive motors to propel the vehicle, means including an element movable from a normally idle position to a plurality of operating positions for effecting a variation of pressure in said normally charged pipe, and inertia operated means for governing the acceleration of the vehicle produced by operation of said drive motors and operatively conditioned to limit the rate of acceleration to a value dependent upon the extent of movement of said element.

38. In a train braking system, in combination, a brake cylinder, a brake controlling valve device normally subject to fluid at a certain pressure and effective to release fluid under pressure from the brake cylinder to release the brakes and operative upon a decrease from said certain pressure to effect a supply of fluid under pressure to said brake cylinder to effect application of the brakes, a train pipe normally charged with fluid at a certain pressure, an electrically operated valve device effective in one position to prevent reduction of the pressure acting on said brake controlling valve device when the pressure in said train pipe is reduced and effective in a different position to permit reduction of the pressure acting on said brake controlling valve device according to the reduction of pressure in said pipe, and means responsive to more than a certain amount of reduction from the certain normal pressure in said pipe for causing operation of said electrically operated valve device from its said one position to its said different position.

39. In a propulsion and braking system for a train of cars, in combination, propulsion means on one or more of said cars, braking means on one or more of said cars, a set of electric wires extending from car to car throughout the train, means controlled by the energization and deenergization of said wires for controlling said propulsion means and said braking means, and a single manually operated control means on one of said cars for controlling the energization and deenergization of said wires.

40. In a propulsion and braking system for a train of cars, in combination, propulsion motors on one or more of said cars, braking means on one or more of said cars including said motors on those cars, a set of electric wires extending from car to car throughout the train, means connected to said wires for at one time controlling the operation of said motors to propel the train and at another time for controlling said braking means to brake the train, and a single control means on one of said cars for controlling the energization and deenergization of said wires to control the operation of the last said means.

41. A propulsion and brake system for a train of cars, comprising propulsion motors on one or more of the cars, brake means on one or more of the cars, a plurality of train wires extending from car to car throughout the train, current-responsive means connected to said wires and effective at one time to control the propulsion motors to propel the cars and at another time to control the braking means, and a single manually controlled element for controlling the energization and deenergization of said wires to cause the current-responsive means to control either the propulsion motors or the braking means.

42. A propulsion and brake system for a train of cars, comprising propulsion motors on one or more of the cars, a plurality of train wires extending throughout the train from car to car, means controlled by energization and deenergization of said wires for at one time controlling the said motors to propel the train and at another time to cause said motors to function as dynamic brakes, and a single manually operable element for controlling energization and deenergization of the said wires in such manner as to cause the last said means to cause the said motors to propel the train or to brake the train.

43. In a propulsion and braking system for a train of cars, in combination, braking means on a plurality of the cars, propulsion means on the cars, a plurality of train wires extending throughout the train from car to car, means controlled by energization and deenergization of said wires for controlling said braking means and said propulsion means, and a manually operated control element on one of said cars so constructed and arranged that movement of said element into one zone controls energization and deenergization of said wires so as to control said braking means and movement into another zone controls energization and deenergization of said wires so as to control said propulsion means.

44. In a combined propulsion and braking system for a train of cars, in combination, brake means associated with each of a plurality of said cars, propulsion means associated with each of a plurality of said cars, a set of electric circuits extending from car to car throughout the train, a pipe extending from car to car throughout the train, means associated with each of a plurality of said cars and operative according to variations in pressure in said pipe for controlling the said brake means and propulsion means, means controlled by said circuits for controlling variations of pressure in said pipe at a plurality of points throughout the train, and a single means on one car of the train for controlling said circuits.

45. In a combined propulsion and braking system for a train of cars, in combination, brake means associated with each of a plurality of the cars, propulsion means associated with each of a plurality of the cars, a set of electric circuits extending from car to car throughout the train, a pipe extending from car to car throughout the train, means associated with each of a plurality of the cars and operative according to variations of pressure in said pipe for controlling said brake means and said propulsion means on the corresponding car, means controlled by said circuits for controlling variations of pressure in said pipe at a plurality of points throughout the train, and means including a single manually operated element movable into one of two zones to control said circuits to in turn control said braking means and movable into the other of the two zones to control said circuits to in turn control said propulsion means.

46. A vehicle brake equipment comprising electric brake means, fluid pressure operated brake means, a control pipe normally charged with fluid at a certain pressure, means responsive to a reduction of the pressure in said pipe below said certain pressure for causing application of the electric braking means, means responsive to a reduction of pressure in said pipe below said certain pressure for effecting application of the fluid pressure operated brake means, and means for preventing response of said last means to effect application of the fluid pressure operated brake means until the pressure in the pipe reduces below a second certain pressure substantially lower than the first said certain pressure.

47. A vehicle brake equipment, comprising an electric motor for propelling the vehicle, means for establishing a motoring circuit and a dynamic braking circuit for said motor, a rheostat adapted to control the current in the motoring circuit and also the current in the dynamic braking circuit, fluid pressure responsive means effective upon variations of pressure for operating said rheostat to control the current in the said circuits, and means effective upon the establishment of the motoring circuit or the dynamic braking circuit to cause variation of the operating pressure of the said fluid pressure responsive means to cause said fluid pressure responsive means to operate the rheostat to control the current in the corresponding circuit.

48. A vehicle brake equipment comprising an electric motor for propelling the vehicle, means for establishing a motoring circuit and a dynamic braking circuit for said motor, a rheostat adapted to control the current in the motoring circuit and also the current in the dynamic braking circuit, fluid pressure responsive means normally subject to fluid at a certain pressure and operative upon a reduction or an increase in the operating pressure thereof from said certain pressure to effect operation of the rheostat to control the current in the said circuits, and means effective upon the establishment of the motoring circuit to cause an increase of pressure above said certain pressure on the fluid pressure responsive means and effective upon the establishment of the dynamic braking circuit to cause a decrease from said certain pressure acting on the fluid pressure responsive means.

JOHN W. LOGAN, Jr.